US009464410B2

(12) United States Patent
Johnson et al.

(10) Patent No.: US 9,464,410 B2
(45) Date of Patent: Oct. 11, 2016

(54) COLLABORATIVE VEHICLE CONTROL USING BOTH HUMAN OPERATOR AND AUTOMATED CONTROLLER INPUT

(75) Inventors: David August Johnson, Cary, NC (US); Julian Sanchez, Shoreview, MN (US); Eric R. Anderson, Galena, IL (US); Mark P. Sahlin, Johnston, IA (US)

(73) Assignee: DEERE & COMPANY, Moline, IL (US)

( * ) Notice: Subject to any disclaimer, the term of this patent is extended or adjusted under 35 U.S.C. 154(b) by 1114 days.

(21) Appl. No.: 13/111,500

(22) Filed: May 19, 2011

(65) Prior Publication Data
US 2012/0293316 A1    Nov. 22, 2012

(51) Int. Cl.
| | | |
|---|---|---|
| *E02F 9/26* | (2006.01) | |
| *E02F 9/20* | (2006.01) | |
| *E02F 3/43* | (2006.01) | |
| *G09B 9/04* | (2006.01) | |
| *G09B 19/16* | (2006.01) | |
| *B60W 50/00* | (2006.01) | |

(52) U.S. Cl.
CPC ............ *E02F 9/265* (2013.01); *E02F 3/434* (2013.01); *E02F 9/2012* (2013.01); *E02F 9/2029* (2013.01); *E02F 9/2037* (2013.01); *E02F 9/2041* (2013.01); *E02F 9/2079* (2013.01); *E02F 9/2083* (2013.01); *E02F 9/2087* (2013.01); *G09B 9/04* (2013.01); *G09B 19/167* (2013.01); *B60W 2050/0071* (2013.01); *B60W 2050/0073* (2013.01); *B60Y 2200/412* (2013.01)

(58) Field of Classification Search
CPC ........... E02F 3/43; E02F 3/431–3/434; E02F 3/847; E02F 9/265; E02F 9/2004–9/2095

USPC ....... 340/3.1, 3.3, 3.42, 3.44, 4.36, 5.1, 438, 340/439; 700/159–195; 701/29.1–29.2, 50; 702/182–183

See application file for complete search history.

(56) References Cited

U.S. PATENT DOCUMENTS

| | | |
|---|---|---|
| 3,643,828 A | 2/1972 | Elliott |
| 4,844,685 A | 7/1989 | Sagaser |
| 4,864,746 A | 9/1989 | Fukumoto |
| 5,000,650 A | 3/1991 | Brewer et al. |
| 5,361,211 A | 11/1994 | Lee et al. |
| 5,490,081 A | 2/1996 | Kuromoto et al. |
| 5,528,843 A | 6/1996 | Rocke |
| 5,598,648 A | 2/1997 | Moriya et al. |
| 5,826,666 A | 10/1998 | Tozawa et al. |
| 5,890,870 A | 4/1999 | Berger et al. |
| 5,899,008 A | 5/1999 | Cobo et al. |
| 5,903,988 A | 5/1999 | Tochizawa et al. |
| 5,909,116 A | 6/1999 | Jin et al. |
| 5,968,103 A | 10/1999 | Rocke |
| 5,968,104 A | 10/1999 | Egawa et al. |
| 5,974,352 A | 10/1999 | Shull |
| 6,064,933 A | 5/2000 | Rocke |
| 6,115,660 A | 9/2000 | Berger et al. |

(Continued)

*Primary Examiner* — Hai Phan
*Assistant Examiner* — Orlando Bousono
(74) *Attorney, Agent, or Firm* — Yee & Associates, P.C.

(57) ABSTRACT

Control of a vehicle to perform a task employs first control input provided by a human operator and second control input provided by an automated controller. A relationship between the first control input and the second control input is determined. Either the first control input or the second control input is used to control the vehicle to perform the task based on the determined relationship. An indicator may be used to indicate to the operator when the control input provided by the human operator is being used to control the vehicle.

25 Claims, 8 Drawing Sheets

(56) References Cited

U.S. PATENT DOCUMENTS

| | | |
|---|---|---|
| 6,205,687 B1 | 3/2001 | Rocke |
| 6,211,471 B1 | 4/2001 | Rocke et al. |
| 6,233,511 B1 | 5/2001 | Berger et al. |
| 6,282,453 B1 | 8/2001 | Lombardi |
| 6,317,669 B1 | 11/2001 | Kurenuma et al. |
| 6,321,153 B1 | 11/2001 | Rocke et al. |
| 6,371,214 B1 | 4/2002 | Anwar et al. |
| 6,496,766 B1 | 12/2002 | Bernold et al. |
| 6,691,437 B1 | 2/2004 | Yost et al. |
| 6,879,899 B2 | 4/2005 | Budde |
| 6,968,241 B2 | 11/2005 | Vonnoe et al. |
| 7,894,962 B2 | 2/2011 | Sahlin et al. |
| 2001/0056319 A1* | 12/2001 | Rocke ............................ 701/50 |
| 2003/0001751 A1 | 1/2003 | Ogura et al. |
| 2004/0055455 A1 | 3/2004 | Tabor et al. |
| 2004/0117092 A1* | 6/2004 | Budde ............................ 701/50 |
| 2005/0242332 A1 | 11/2005 | Ueki et al. |
| 2006/0038556 A1 | 2/2006 | Low et al. |
| 2006/0192552 A1 | 8/2006 | Low et al. |
| 2006/0232268 A1 | 10/2006 | Arns et al. |
| 2008/0155866 A1* | 7/2008 | Congdon et al. ............... 37/416 |
| 2008/0199294 A1 | 8/2008 | Sahlin et al. |
| 2008/0201043 A1 | 8/2008 | Sahlin et al. |
| 2008/0201108 A1* | 8/2008 | Furem et al. .................. 702/182 |
| 2008/0234901 A1 | 9/2008 | Johnson et al. |
| 2008/0234902 A1* | 9/2008 | Johnson et al. ................ 701/50 |
| 2009/0018728 A1 | 1/2009 | Sahlin et al. |
| 2009/0018729 A1 | 1/2009 | Sahlin et al. |
| 2009/0222176 A1 | 9/2009 | Florean et al. |
| 2010/0045486 A1* | 2/2010 | Daveze et al. ................ 340/963 |

* cited by examiner

COLLABORATIVE VEHICLE CONTROL USING BOTH HUMAN OPERATOR AND AUTOMATED CONTROLLER INPUT

FIELD OF THE INVENTION

The illustrative embodiments relate generally to vehicles and in particular to a method and apparatus for controlling a vehicle to perform a task. Still more particularly, the illustrative embodiments provide a method and apparatus for controlling a vehicle to perform a task using control inputs from both a human operator and an automated controller.

BACKGROUND OF THE INVENTION

Vehicles are used to perform various tasks. For example, vehicles often are used in construction to build structures. Such structures may include, for example, a building, a dam, a bridge, a manufacturing facility, a roadway, and other structures. Construction-related tasks performed by vehicles include, for example, loading objects and materials, moving objects and materials from or into a desired position, digging holes and trenches, and other construction-related tasks. Vehicles used to perform construction-related tasks may include, for example, graders, loaders, backhoes, excavators, bulldozers, and other types of vehicles.

A human operator employs psychomotor skills to operate various types of vehicles to perform construction-related tasks. A psychomotor skill is the ability to coordinate muscle movement with perceptual cues to perform a task. For example, psychomotor skills include hand movements coordinated with visual perceptual information from the eyes to perform a task.

An example of a psychomotor task is driving an automobile. In this case, the human driver processes multiple cues or pieces of information and performs specific physical actions. For example, the driver performs the physical task of steering based on the driver's perception of the road, the weather, obstacles, and other cues.

Another example of a psychomotor task is operating a vehicle to perform a construction-related task. For example, to operate a bucket loader an operator manipulates a controller, such as a joystick to elevate a boom and curl a bucket to perform a digging or bucket-filling operation. The operator performs this task based on the operator's perception of the position and orientation of the vehicle, boom, and bucket with respect to the material to be loaded into the bucket and other cues.

SUMMARY

Illustrative embodiments provide a method of controlling a vehicle. A first control input is obtained. The first control input is relative to a manual input provided by a human operator. A number of sensor inputs also are obtained. The number of sensor inputs indicates a state of the vehicle. A second control input is generated using the number of sensor inputs. A relationship between the first control input and the second control input is determined. Either the first control input or the second control input is selected based on the determined relationship between the first control input and the second control input. Responsive to selecting the first control input, the manual input provided by the human operator is used to control the vehicle. Responsive to selecting the second control input, the second control input is used to control the vehicle.

Illustrative embodiments also provide an apparatus for controlling a vehicle. The apparatus includes a human operator controller, a number of sensors mounted on the vehicle, and a processor unit. The human operator controller is configured to receive manual input from a human operator to control the vehicle. The human operator controller is configured to provide a first control input relative to the manual input. The number of sensors is configured to generate a number of sensor inputs. The number of sensor inputs indicates a state of the vehicle. The processor unit is coupled to the human operator controller and to the number of sensors. The processor unit is configured to generate a second control input using the number of sensor inputs, to determine a relationship between the first control input and the second control input, to select either the first control input or the second control input based on the determined relationship between the first control input and the second control input, to generate first control signals to control the vehicle using the manual input provided by the human operator responsive to selecting the first control input, and to generate the first control signals to control the vehicle using the second control input responsive to selecting the second control input.

Illustrative embodiments further provide a computer program product for controlling a vehicle. The computer program product includes program instructions stored on a computer readable storage medium. The program instructions include program instructions to obtain a first control input, wherein the first control input is relative to a manual input provided by a human operator, to obtain a number of sensor inputs, wherein the number of sensor inputs indicate a state of the vehicle, to generate a second control input using the number of sensor inputs, to determine a relationship between the first control input and the second control input, to select either the first control input or the second control input based on the determined relationship between the first control input and the second control input, to generate first control signals to control the vehicle using the manual input provided by the human operator responsive to selecting the first control input, and to generate the first control signals to control the vehicle using the second control input responsive to selecting the second control input.

Various features, functions, and advantages can be achieved independently in various illustrative embodiments or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DETAILED DESCRIPTION

Figure 1:
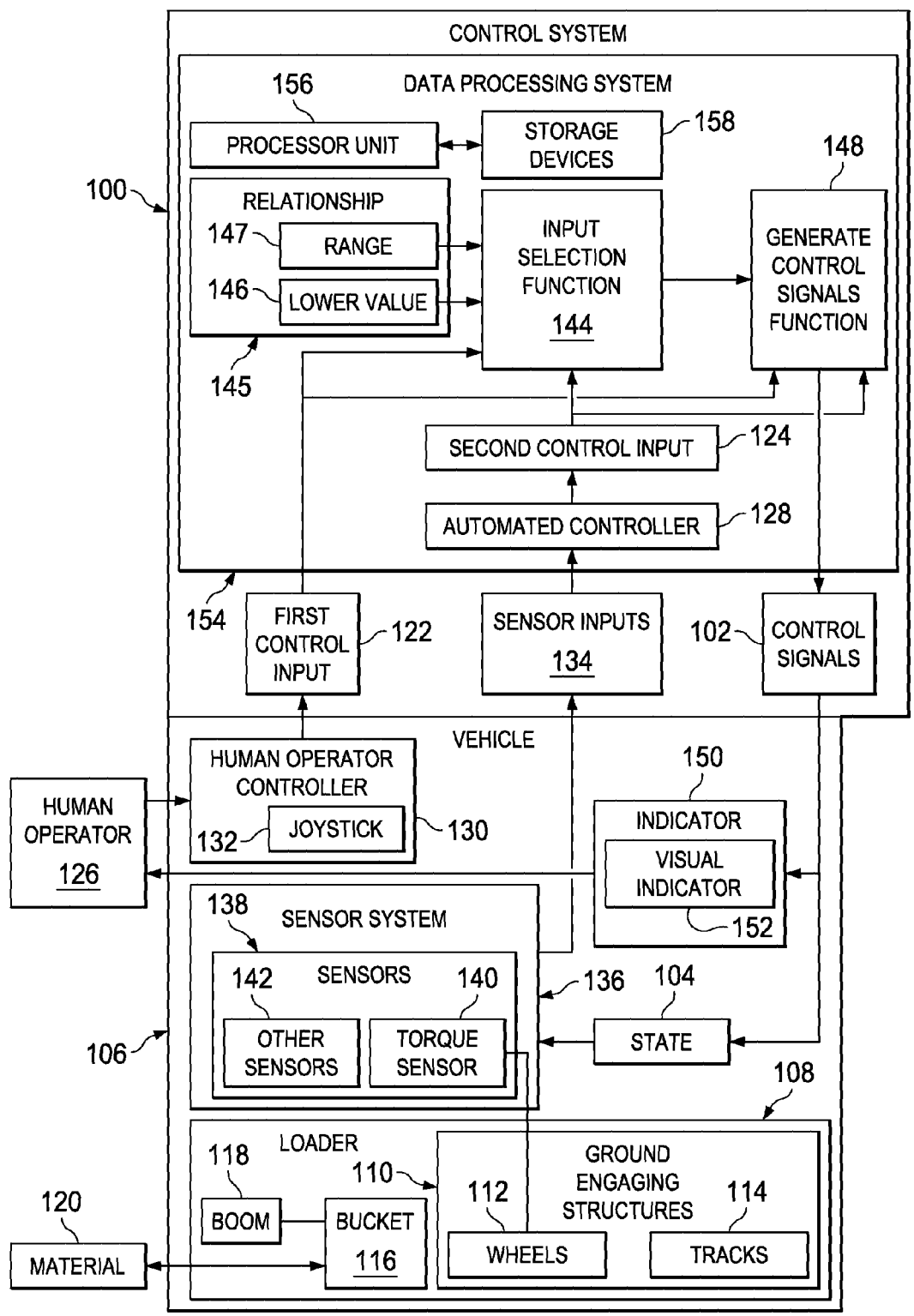
FIG. 1 is a block diagram of a control system for controlling a vehicle in accordance with an illustrative embodiment.

The different illustrative embodiments recognize and take into account a number of different considerations. For example, the different illustrative embodiments recognize and take into account that the complexity of a task using psychomotor skills is a function of the physical and cognitive demands that the task places on the human performing the task. For example, the complexity of a task can be a function of the number of perceptual cues or inputs that the human has to attend to simultaneously to perform the task. Complexity also can be a function of the characteristics of the cues that the human has to process to perform the task and the characteristics of the physical responses that are required. For very complex tasks, it can take human operators hundreds or thousands of trials to achieve an asymptotic level of performance.

One field in which psychomotor tasks of high complexity are common is in the operation of various types of vehicles to perform tasks related to construction. To operate these types of vehicles, the human operator has to attend to a variety of cues, decipher and integrate the meaning of those cues, and perform control actions to direct the movements of the vehicle. However, human operator performance is limited by the amount of information that can be processed and the number of actions that can be performed concurrently. An operator's performance may vary based on the operator's level of skill, experience, fatigue, and attentiveness, among other factors. For example, for loaders or other vehicles for loading or digging material, a novice operator may move or manipulate materials less efficiently than an experienced operator.

The different illustrative embodiments recognize and take into account that one approach to attempt to improve the performance of a vehicle to perform a construction-related task beyond the capabilities of a human operator is to automate specific task functions. For example, automated control systems have been developed for automatically controlling a loader to load material into the loader bucket. In this case, the automated control system implements a method that aims to replace the human operator's input in the task of bucket filling with that of an automated bucket-filling system.

The different illustrative embodiments recognize and take into account that one limitation of using an automated bucket-filling system for bucket loading is that an automated system fails to utilize the knowledge and perceptual capabilities of human operators to perform the task. There may be instances during the process of filling the bucket of a loader in which the psychomotor skills of the human operator can outperform the capabilities of the automated technology.

The different illustrative embodiments also recognize and take into account that, in many cases, it may take a human operator a long period of time to develop the knowledge and psychomotor skills necessary to control a vehicle to perform successfully a construction-related task. Therefore, it would be valuable to be able to capture and use these skills once they are developed.

In accordance with an illustrative embodiment, a method and apparatus for controlling a vehicle is provided in which the control inputs of a human operator are integrated with the control inputs of an automated system. In accordance with an illustrative embodiment, the control inputs from the human operator are used in combination with the control inputs of the automated system to provide collaborative vehicle control to perform a construction-related task.

For example, in accordance with an illustrative embodiment, the control inputs of a human operator may be used in combination with the control inputs of an automated system to control a loader to perform the task of bucket filling. A collaborative method for bucket filling, using both human operator control input and automated system control input, can provide higher levels of performance than if the inputs from either a human operator alone or an automated system alone are used exclusively during a bucket-filling operation.

In accordance with an illustrative embodiment, both a human operator and an automated controller generate control inputs for controlling a vehicle to perform a task. The separate control inputs from the human operator and from the automated controller are compared to determine which of the two control inputs to use to control the vehicle to perform the task. At any particular point in time, either the control inputs from the human operator or the control inputs from the automated controller are used to control the vehicle to perform a task based on the relationship between the control inputs at that time. For example, to optimize performance of the task, the control input, having the relatively lower value at any point in time, may be used to control the vehicle at that point in time.

In accordance with another example, the automated controller may be assumed to generate control inputs that perform a task at a near optimal level. Therefore, when the human operator control input is within a range of the automated controller control input, the human operator's input is used to control the vehicle to perform the task. When the control input of the human operator falls outside of the range of the automated controller control input, it may be assumed that the human operator is a novice or is simply failing to perform at a desired level for some other reason. In this case, the control input from the automated controller may be used to control the vehicle to perform the task.

With reference now to FIG. 1, a block diagram of a control system for controlling a vehicle is depicted in accordance with an illustrative embodiment. In accordance with an illustrative embodiment, control system 100 generates control signals 102 for controlling state 104 of vehicle 106.

State 104 of vehicle 106 refers to the general state of operation of vehicle 106 at any point in time. State 104 may include both physical and operational conditions of vehicle 106 at any point in time. For example, state 104 may include the position, orientation, or operating condition of vehicle 106 at any point in time. State 104 also may include the position, orientation, or operating condition of any component or substructure of vehicle 106 at any point in time. In accordance with an illustrative embodiment, state 104 of vehicle 106 may be controlled over a period of time to perform a task. For example, state 104 of vehicle 106 may be controlled over a period of time to perform a construction-related task.

Vehicle 106 may include any machine that is designed to perform a task. For example, vehicle 106 may be a vehicle designed to perform a construction-related task. For example, vehicle 106 may be a grader, loader, backhoe, excavator, bulldozer, or other type of vehicle.

In accordance with an illustrative embodiment, vehicle 106 may be loader 108. Loader 108 may be supported on one or more moveable ground engaging structures 110. For example, ground engaging structures 110 may include wheels 112, tracks 114, or a combination of wheels 112 and tracks 114. Loader 108 may be moved across the ground on ground engaging structures 110.

Loader 108 includes bucket 116 mounted at the end of boom 118. Boom 118 is moveable with respect to loader 108 responsive to control signals 102. Bucket 116 is moveable with respect to boom 118 responsive to control signals 102. By moving loader 108, boom 118, and bucket 116 in a coordinated manner, material 120 may be loaded into bucket 116. Material 120 may include any particulate material or individual items that may be used in or that may be required to be moved during a construction operation. For example, material 120 may include sand, gravel, soil, rock, construction materials, or any other material or items that may be moved by loader 108. The task of loading material 120 into bucket 116 may be referred to as bucket filling.

In accordance with an illustrative embodiment, control system 100 generates control signals 102 for controlling vehicle 106 using a combination of first control input 122 and second control input 124. First control input 122 is provided by human operator 126. Second control input 124 is provided by automated controller 128.

First control input 122 is relative to manual input provided by human operator 126. Human operator 126 provides first control input 122 by interaction with human operator controller 130. Human operator controller 130 may include any device or system for generating first control input 122 either directly or indirectly responsive to operation of human operator controller 130 by human operator 126. The implementation of human operator controller 130 in any particular application will depend upon the task to be controlled and how human operator 126 is to interact with human operator controller 130 to perform the task. For example, human operator 126 may interact with human operator controller 130 by hand, by foot, with another part of the operator's body, or with multiple parts of the operator's body.

For example, human operator controller 130 may include joystick 132. Joystick 132 may be moved in a first direction to generate first control input 122 for controlling the movement of boom 118 of loader 108. In this case, the magnitude of first control input 122 for controlling movement of boom 118 may be relative to the distance that joystick 132 is moved by human operator 126 in the first direction. Joystick 132 may be moved in a second direction to generate first control input 122 for controlling the movement of bucket 116 of loader 108 with respect to boom 118. In this case, the magnitude of first control input 122 for controlling movement of bucket 116 may be relative to the distance that joystick 132 is moved by human operator 126 in the second direction.

Automated controller 128 generates second control input 124 from sensor inputs 134 provided by sensor system 136. Sensor system 136 may include number of sensors 138. Sensors 138 are used to detect state 104 of vehicle 106. For example, individual sensors 138 may be used to detect state 104 of individual components or subsystems of vehicle 106. Sensor inputs 134 provided by sensor system 136 to automated controller 128 thus are relative to state 104 of vehicle 106. The implementation of sensors 138, in any particular application, will depend upon the particular state 104 of vehicle 106 or of a component of vehicle 106 that is required to be detected and provided as sensor inputs 134 to automated controller 128 to generate second control input 124.

Automated controller 128 generates second control input 124 for controlling state 104 of vehicle 106 to perform a task based on the sensing of state 104 by sensor system 136. Automated controller 128 may generate second control input 124 to control state 104 of a number of components of vehicle 106. Sensor inputs 134 that are used to generate second control input 124 may be obtained from sensors 138 that may be used to detect state 104 of components of vehicle 106 that are the same as or different from the components of vehicle 106 that are being controlled by automated controller 128 based on those sensor inputs 134.

Automated controller 128 may generate second control input 124 for controlling vehicle 106 to perform a construction-related task. For example, automated controller 128 may generate second control input 124 for controlling boom 118 and bucket 116 of loader 108 to load material 120 into bucket 116.

Second control input 124 for automatically controlling such a bucket-filling operation may be provided by automated controller 128 using sensor inputs 134 including sensor inputs 134 provided by torque sensor 140. Torque sensor 140 may include a sensor device, system, or automated procedure for detecting or otherwise determining a level of torque applied to at least one of wheels 112 of loader 108. The torque level detected or otherwise determined by torque sensor 140 is provided as one of sensor inputs 134 to automated controller 128.

Rimpull is the force or torque available between wheels 112 and the ground or other surface to move loader 108 or to push loader 108 into a pile of material 120. Rimpull is limited by the traction of wheels 112 with respect to the ground or other surface. The value of rimpull or a torque level indicates how hard a vehicle is pushing or pulling. Loader 108 may push into a pile of material 120 during digging or another operation in which bucket 116 is filled with material 120. Torque sensor 140 detects or estimates the rimpull or torque level associated with one or more wheels 112 of loader 108. Automated controller 128 may estimate a torque level or rimpull based on one or more samples, readings, or measurements from torque sensor 140.

In accordance with an illustrative embodiment, automated controller 128 may be configured to generate second control input 124 to control loader 108 to perform the task of filling bucket 116 with material 120 in the following manner. The process begins with boom 118 lowered and bucket 116 in a starting position. As loader 108 is moved forward into a pile of material 120, automated controller 128 generates second control input 124 to raise boom 118 when the torque level determined from torque sensor 140 exceeds a first threshold. Automated controller 128 generates second control input 124 to rotate bucket 116 upward when the torque level determined from torque sensor 140 meets or exceeds a second threshold.

Illustrative embodiments are not limited by the method described as an example for generating second control input 124 to control loader 108 to perform automatically the task of bucket filling. Other methods may be employed by automated controller 128 to generate second control input 124 to perform this task. Other methods for generating second control input 124 may employ sensor inputs 134 provided by a number of other sensors 142 instead of or in addition to torque sensor 140. For example, other sensors 142 may include a number of sensors for detecting the ground speed of vehicle 106 or the acceleration of boom 118.

In accordance with an illustrative embodiment, first control input 122 from human operator 126 and second control input 124 from automated controller 128 are generated simultaneously. Input selection function 144 is configured to determine which of first control input 122 or second control input 124 is used to generate control signals 102 to control state 104 of vehicle 106 at any point in time to perform a desired task.

In accordance with an illustrative embodiment, input selection function 144 determines relationship 145 between first control input 122 and second control input 124. For example, relationship 145 may be determined to indicate which of first control input 122 or second control input 124 has the relatively lower value 146 at any point in time. Alternatively, or additionally, relationship 145 may be determined to indicate whether first control input 122 is within range 147 of second control input 124 at any point in time. Alternatively, or additionally, input selection function 144 may determine any other relationship 145 between first control input 122 and second control input 124.

Based on the determined relationship 145 between first control input 122 and second control input 124, input selection function 144 selects either first control input 122 or second control input 124 to be used to generate control signals 102 for controlling operation of vehicle 106 at any point in time. For example, in accordance with a first illustrative embodiment, input selection function 144 may select one of first control input 122 or second control input 124 that has relatively lower value 146 at any point in time for controlling vehicle 106 at that point in time. Alternatively, in accordance with a second illustrative embodiment, input selection function 144 may select control signals 102 for controlling vehicle 106 to be generated from first control input 122, provided by human operator 126, at times when first control input 122 is determined to be within range 147 of second control input 124. In this case, input selection function 144 selects control signals 102 for controlling vehicle 106 to be generated from second control input 124, provided by automated controller 128, at times when first control input 122 is determined not to be within range 147 of second control input 124. Generate control signals function 148 generates control signals 102 from either first control input 122 or second control input 124 as determined by the selection made by input selection function 144.

In accordance with an illustrative embodiment, automated controller 128 may be assumed to generate second control input 124 for performing a desired task at a near optimal level. When first control input 122 from human operator 126 has relatively lower value 146 than or is within range 147 of second control input 124 from automated controller 128, variations between first control input 122 and second control input 124 may represent potential performance improvements due to skills of human operator 126 that are not captured by the method implemented in automated controller 128. Therefore, in such cases, input from human operator 126 may be used to control vehicle 106 to perform the task. However, when first control input 122 from human operator 126 does not have a relatively lower value 146 than or falls outside of range 147 from second control input 124 provided by automated controller 128, it may be assumed that human operator 126 is a novice or is simply failing to perform at a desired level for some other reason. In these cases, second control input 124 from automated controller 128 may be used to control vehicle 106 to perform the task. As a result, in accordance with an illustrative embodiment, overall task performance may be improved by using either manual or automated control at appropriate times during the task process.

The comparison of first control input 122 with second control input 124 by input selection function 144 to determine relationship 145 may require that first control input 122 and second control input 124 be provided in, or converted into, comparable formats. For example, first control input 122 and second control input 124 may be provided as, or converted into, a number of numerical values that may be compared by input selection function 144 to determine relationship 145. Alternatively, first control input 122 and second control input 124 may be provided as, or converted into, a number of signal levels that may be compared by input selection function 144 to determine relationship 145. The specific format of first control input 122 and second control input 124 that is used for the comparison performed by input selection function 144 to determine relationship 145 in any particular application may depend on a number of factors. For example, such factors may include the format of the output provided by human operator controller 130, the format of the output provided by automated controller 128, and the details of implementation of input selection function 144.

Implementation of generate control signals function 148 for any particular application also may depend on a number of factors. For example, such factors may include the format in which first control input 122 and second control input 124 are provided and the format required for control signals 102 used to control state 104 of vehicle 106. In one case, first control input 122 and second control input 124 may be provided in the format of control signals 102. In this case, generate control signals function 148 may be implemented as a switch, under control of input selection function 144, to select control signals 102 from between first control input 122 and second control input 124. In other cases, generate control signals function 148 may be configured to convert first control input 122 and second control input 124 from a format used by input selection function 144 to perform a comparison to a format for use as control signals 102.

In accordance with an illustrative embodiment, control signals 102 generated by control system 100 also may be used to control indicator 150. Indicator 150 may be controlled to provide an indication to human operator 126 when first control input 122 from human operator 126 is being used to control vehicle 106 or when second control input 124 from automated controller 128 is being used to control vehicle 106. Indicator 150 may be visual indicator 152. For example, visual indicator 152 may include a lamp or light emitting diode. Visual indicator 152 may be mounted on vehicle 106 in the line of sight of human operator 126. Alternatively, or additionally, indicator 150 may include an audible indicator, a tactile indicator, or a visual indicator implemented in a different manner.

Indicator 150 may be controlled to train a novice operator to control vehicle 106 to perform a task. For example, visual indicator 152 may be turned on when vehicle 106 is being controlled by first control input 122 from human operator 126 and may be turned off when vehicle 106 is being controlled by second control input 124 from automated controller 128. In this case, the novice human operator is provided with positive feedback when the input provided via human operator controller 130 corresponds to or is within a range of optimal or desired performance. Visual indicator 152 provides immediate feedback to the operator in training when performance falls outside of the desired level or range. The operator is able to respond immediately to this feedback by adjusting the input provided via human operator controller 130 until visual indicator 152 is turned back on. In this manner, the psychomotor skills required by the operator to perform a task using vehicle 106 may be learned more quickly over a fewer number of trials. Furthermore, a level of efficient productivity is maintained, even during such training, because control of the task performance is given over to automated controller 128 whenever the novice operator's performance falls outside of an acceptable level or range.

In accordance with an illustrative embodiment, control system 100 may be implemented in data processing system 154. For example, data processing system 154 may include processor unit 156 and number of storage devices 158. Processor unit 156 may include, for example, a programmable digital device. Storage devices 158 may include, for example, memory accessible by processor unit 156. Storage devices 158 may include stored thereon program instructions for controlling processor unit 156 to implement the functions of control system 100. For example, storage devices 158 may have stored thereon program instructions for obtaining first control input 122 and second control input 124 and for implementing input selection function 144 and generate control signals function 148. Storage devices 158 also may have stored thereon program instructions for obtaining sensor inputs 134 and for implementing the functions of automated controller 128. Alternatively, automated controller 128 may be implemented separately from, but in communication with, data processing system 154. Storage devices 158 also may store data for use by processor unit 156. For example, storage devices 158 may store first control input 122, sensor inputs 134, second control input 124, and range 147 for use by processor unit 156 in implementing automated controller 128, input selection function 144, and generate control signals function 148.

The illustration of FIG. 1 is not meant to imply physical or architectural limitations to the manner in which different illustrative embodiments may be implemented. Other components in addition to or in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

For example, human operator 126, control system 100, or both, may be located on vehicle 106 while vehicle 106 is being controlled by control system 100. Alternatively, human operator 126, control system 100, or both, may be located remote from vehicle 106 while vehicle 106 is being controlled by control system 100. First control input 122 may be provided from a remote human operator controller 130 to control system 100 mounted on vehicle 106 via a wired or wireless connection. In another example, control signals 102 may be provided from a remote control system 100 to vehicle 106 via a wired or wireless connection.

State 104 of vehicle 106 may be changed by operation of a number of actuators. The actuators employed in any particular application may depend on various factors. Such factors may include, for example, the type of vehicle 106, the tasks to be performed by vehicle 106, and the particular state 104 to be changed by the actuator. Such actuators may be implemented using any appropriate electrical, mechanical, electromechanical, or hydraulic device, or any combination of such devices. Appropriate electrical interfaces may be provided for applying control signals 102 to such actuators to change state 104 in a desired manner. The electrical interfaces employed in any particular application may depend on various factors. Such factors may include, for example, the form of control signals 102 provided by control system 100 and the actuators to be controlled by such signals. For example, an electrical interface may comprise an actuator, a solenoid, a relay, a servo-motor, or an electrically or electronically controlled valve, or another electromechanical device for controlling a hydraulic valve or hydraulic flow of hydraulic fluid associated with a hydraulic cylinder.

Control system 100 may be implemented as a digital system. For example, control system 100 may be implemented as a digital system comprising processor unit 156 in combination with software in storage devices 158. Alternatively, control system 100 may be implemented as an analog system or with a combination of analog and digital components for implementing the functions described herein.

Figure 2:
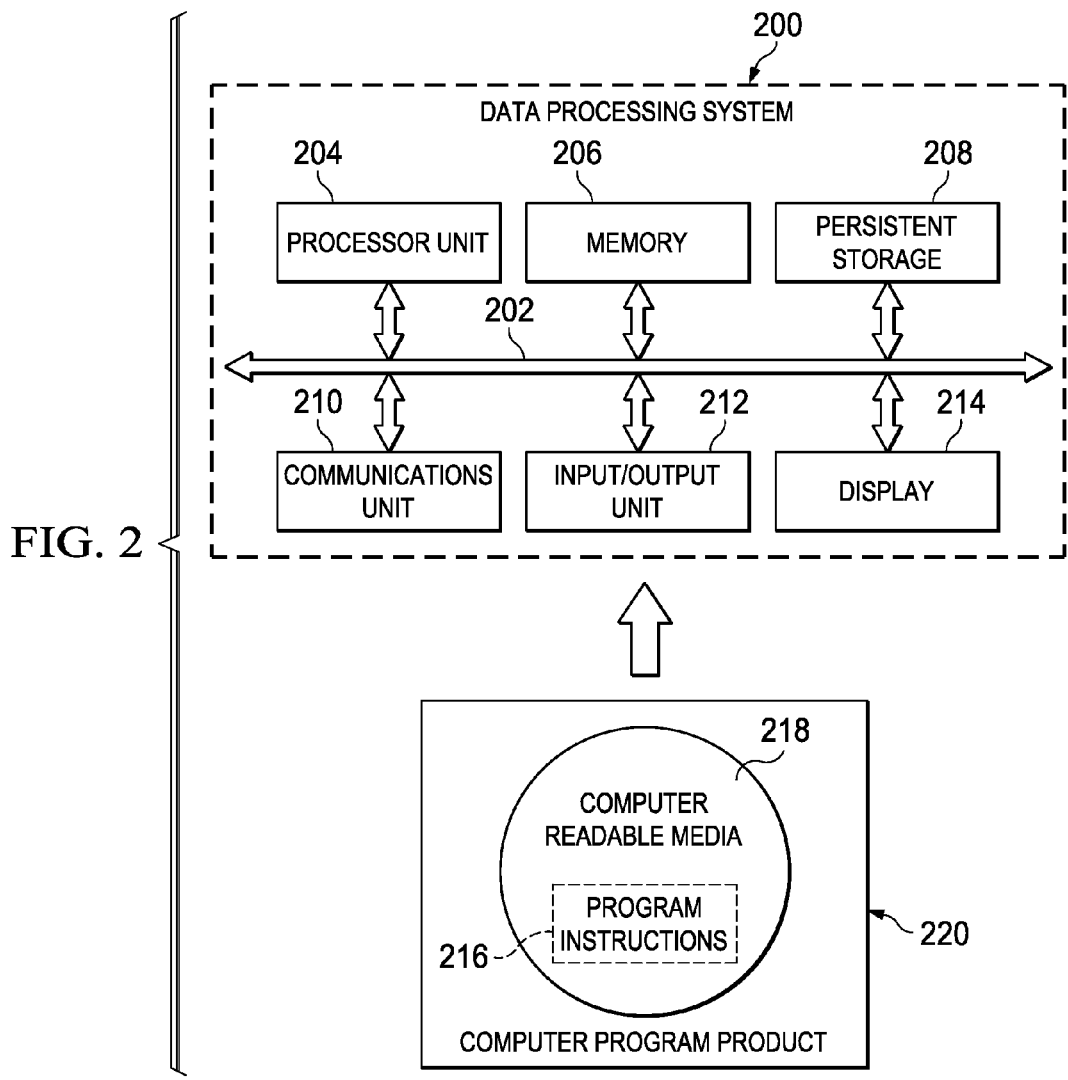
FIG. 2 is a block diagram of a data processing system in accordance with an illustrative embodiment.

With reference now to FIG. 2, a block diagram of a data processing system is depicted in accordance with an illustrative embodiment. Data processing system 200 is an example of one implementation of data processing system 154 in FIG. 1. In this illustrative example, data processing system 200 includes communications fabric 202, which provides communications between processor unit 204, memory 206, persistent storage 208, communications unit 210, input/output (I/O) unit 212, and display 214.

In this illustrative example, processor unit 204 is an example of one implementation of processor unit 156 in FIG. 1. Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. In this illustrative example, memory 206 and persistent storage 208 are examples of one implementation of storage devices 158 in FIG. 1. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program instructions, program code, computer usable program code, or computer readable program code that may be read and executed by a processor in processor unit 204. The program code in the different embodiments may be embodied on different physical or tangible computer readable media, such as memory 206 or persistent storage 208.

Program instructions 216 are located in a functional form on computer readable media 218 that is selectively removable and may be loaded onto or transferred to data processing system 200 for execution by processor unit 204. Program instructions 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer readable storage media or computer recordable storage media. In some instances, computer readable media 218 may not be removable.

Alternatively, program instructions 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communication links or wireless transmissions containing the program code.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, communications unit 210 may include one or more devices used to transmit and receive data, such as a modem or a network adapter. Further, a memory may be, for example, memory 206 or a cache, such as found in an interface and memory controller hub that may be present in communications fabric 202.

Figure 3:
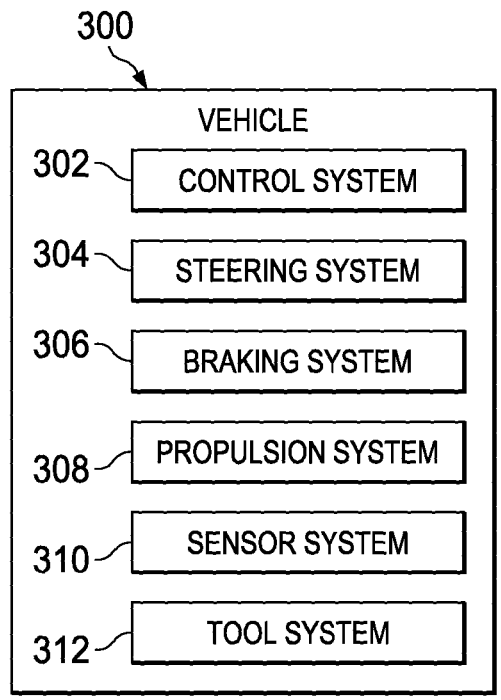
FIG. 3 is a block diagram of components used to control a vehicle in accordance with an illustrative embodiment.

With reference now to FIG. 3, a block diagram of components used to control a vehicle is depicted in accordance with an illustrative embodiment. In this example, vehicle 300 is an example of one implementation of vehicle 106 in FIG. 1. In this example, vehicle 300 includes control system 302, steering system 304, braking system 306, propulsion system 308, sensor system 310, and tool system 312.

Control system 302 may be, for example, a data processing system, such as data processing system 154 in FIG. 1 or data processing system 200 in FIG. 2, or some other device that may execute processes to control movement of vehicle 300. Control system 302 may be, for example, a computer, an application specific integrated circuit, and/or some other suitable device. Different types of devices and systems may be used to provide redundancy and fault tolerance. Control system 302 may execute processes to control steering system 304, braking system 306, and propulsion system 308 to control movement of vehicle 300. Control system 302 may execute processes to control tool system 312 along with movement of vehicle 300 to perform a task. Control system 302 may employ sensor data provided from sensor system 310 to implement the control functions provided by control system 302.

Control system 302 may send various commands to the various other systems of vehicle 300 to operate vehicle 300 in different modes of operation. These commands may take various forms depending on the implementation. For example, the commands may be analog electrical signals in which a voltage and/or current change is used to control these systems. In other implementations, the commands may take the form of data sent to the systems to initiate the desired actions. In any case, such commands also may be referred to as control signals.

Steering system 304 may control the direction or steering of vehicle 300 in response to commands received from control system 302. Steering system 304 may be, for example, an electrically controlled hydraulic steering system, an electrically driven rack and pinion steering system, an Ackerman steering system, a skid-steer steering system, a differential steering system, or some other suitable steering system.

Braking system 306 may slow down and/or stop vehicle 300 in response to commands from control system 302. Braking system 306 may be an electrically controlled braking system. Braking system 306 may be, for example, a hydraulic braking system, a friction braking system, or some other suitable braking system that may be electrically controlled.

Propulsion system 308 may move vehicle 300 in response to commands from control system 302. Propulsion system 308 may maintain or increase the speed at which vehicle 300 moves in response to instructions received from control system 302. Propulsion system 308 may be an electrically controlled propulsion system. Propulsion system 308 may be, for example, an internal combustion engine, an internal combustion engine/electric hybrid system, an electric engine, or some other suitable propulsion system.

Sensor system 310 may be a set of sensors used to collect information about vehicle systems and the environment around vehicle 300. For example, information from sensor system 310 may be sent to control system 302 to provide data in identifying how vehicle 300 should move in different modes of operation. In these examples, a set refers to one or more items. A set of sensors is one or more sensors in these examples.

Tool system 312 may include a number of mechanical structures that may be operated to perform a task. The mechanical structures forming tool system 312 may be operated by actuators. Such actuators may include electrical, mechanical, electromechanical, or hydraulic devices, or combinations of such devices. The actuators in tool system 312 may be operated by control signals received from control system 302.

The implementation of tool system 312 in any particular application will depend upon the task that is to be performed by operation of tool system 312. For example, for the task of digging or loading, tool system 312 may include a movable boom with a moveable bucket mounted on an end of the boom.

Figure 4:
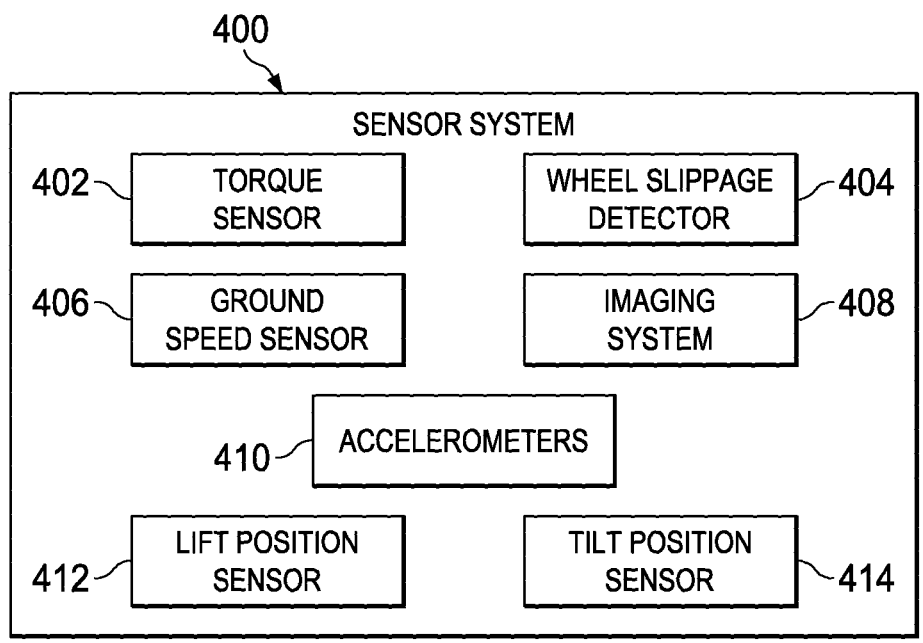
FIG. 4 is a block diagram of a sensor system in accordance with an illustrative embodiment.

With reference now to FIG. 4, a block diagram of a sensor system is depicted in accordance with an illustrative embodiment. Sensor system 400 is an example of one implementation of sensor system 136 in FIG. 1 and sensor system 310 in FIG. 3.

Sensor system 400 includes, for example, torque sensor 402, wheel slippage detector 404, ground speed sensor 406, imaging system 408, accelerometers 410, lift position sensor 412, and tilt position sensor 414. These different sensors may be used to identify the current state of and the operating environment around a mobile utility vehicle. Sensor data provided by the specific sensors illustrated and described herein may be used for controlling automatically a bucket-filling operation by a loader. Sensor system 400 may include more, fewer, or different sensors, depending upon the specific tasks or other operations to be performed by a vehicle using input from such sensors. In general, the sensors in sensor system 400 may be selected for sensing conditions as needed to operate a vehicle to perform desired vehicle operations.

Torque sensor 402 may be implemented in any appropriate manner to detect rimpull as described above. The output of torque sensor 402 may be provided as a torque signal or as torque data in analog or digital form. Torque sensor 402 may be mounted anywhere in the drivetrain of a vehicle to directly or indirectly determine or estimate the torque associated with one or more wheels of the vehicle.

For example, torque sensor 402 may comprise a sensor input shaft and a sensor output shaft. A transducer, a strain gauge, a piezoelectric member, or a piezoresistive member is coupled or connected between the sensor input shaft and the sensor output shaft. In this case, a sensor output may be generated from a change in electrical property of the device connected between the sensor input shaft and the sensor output shaft in response to torque applied between the sensor input shaft and the sensor output shaft.

In an alternative embodiment, torque sensor 402 may comprise a magnetic transducer, the combination of a magnetic sensor and one or more magnets, or the combination of a magneto-restrictive sensor and one or more magnets. For instance, one or more magnetic members may be secured to a wheel, a hub of the wheel, a wheel shaft, or a driven shaft. A transducer, magneto-restrictive sensor, or a magnetic sensor device is spaced apart from the magnetic member or members. The transducer, magneto-restrictive sensor, or magnetic sensor measures a change in the magnetic field produced by the magnetic members as the shaft rotates. Torque, shaft velocity, wheel rotational velocity (e.g., speed), or any combination of these parameters may be estimated from the measured change in magnetic field.

Wheel slippage detector 404 detects slippage of one or more wheels of a vehicle relative to the ground or another surface upon which the wheels rest. A drive motor controller may provide a motor control signal or motor data, such as motor shaft speed data or associated motor torque data to wheel slippage detector 404. Torque sensor 402 provides detected torque associated with one or more wheels to wheel slippage detector 404. Wheel slippage detector 404 may detect wheel slippage if the instantaneous motor torque data differs from the estimated or detected instantaneous torque by a material differential. Alternatively, wheel slippage detector 404 may detect wheel slippage based on a difference between instantaneous velocity of a wheel and instantaneous velocity applied by a drive motor or engine.

In accordance with an illustrative embodiment, a torque adjustment module or controller may respond to detected wheel slippage in accordance with various techniques that may be applied alternately or cumulatively. Under a first technique, the torque adjustment module varies the motor control signal or motor data, such as motor shaft speed data or associated motor torque data, in response to material detected wheel slippage. Under a second technique, the torque adjustment module decreases the reference torque level data or various torque thresholds that are used for automated vehicle control in response to wheel slippage. For example, the torque adjustment module may compensate for wheel slippage where a typical or assumed degree of traction may not be present on the ground or surface on which the vehicle is currently operating. The torque adjustment module is responsible for communicating the degree of torque adjustment of reference torque levels to compensate for detected wheel slippage by referencing an equation, a look-up table, a chart, a database, or another data structure which may be stored in a data storage device. Under a third technique, the torque adjustment module may provide reference torque level data to a motor drive controller such that the motor drive controller can retard the applied rotational energy to prevent wheel slippage or to otherwise maximize the amount of push into a pile of material to be moved or dug.

Ground speed sensor 406 may comprise an odometer, a dead-reckoning system, a location-determining receiver, such as a Global Positioning System receiver, or another device that provides the observed speed or observed velocity of a vehicle with respect to the ground.

Imaging system 408 may include, for example, a camera and image processing system for processing image data provided by the camera. For example, imaging system 408 may employ color recognition software or pattern recognition software for identifying or confirming the presence or position of a pile of material to be loaded by a bucket-filling operation into the bucket of a loader.

Accelerometers 410 may include, for example, one or more accelerometers mounted on the boom or associated with the boom of a loader. These accelerometers 410 may detect or measure an acceleration or deceleration of the boom. Boom acceleration may be used to estimate when the boom approaches or enters into a stalled state, when acceleration approaches zero or falls below a minimum threshold. Detected boom acceleration may be used to trigger curling of the bucket, upward rotation of the bucket, or other movement of the bucket to relieve stress during an automated bucket-filling operation, for example.

Lift position sensor 412 and tilt position sensor 414 may produce signals indicating the positions of the boom and bucket of a loader, respectively. For example, lift position sensor 412 may produce signals responsive to the extension of a boom lift actuator. Tilt position sensor 414 may produce signals responsive to the extension of a bucket tilt actuator. Lift position sensor 412 and tilt position sensor 414 may be implemented using radio frequency resonance sensors, for example, to sense the boom and bucket positions, respectively. Alternatively, lift position sensor 412 and tilt position sensor 414 may obtain position information derived from joint angle measurements using rotary potentiometers, or the like, to measure rotation of the boom lift actuator and of the bucket tilt actuator, respectively.

Figure 5:
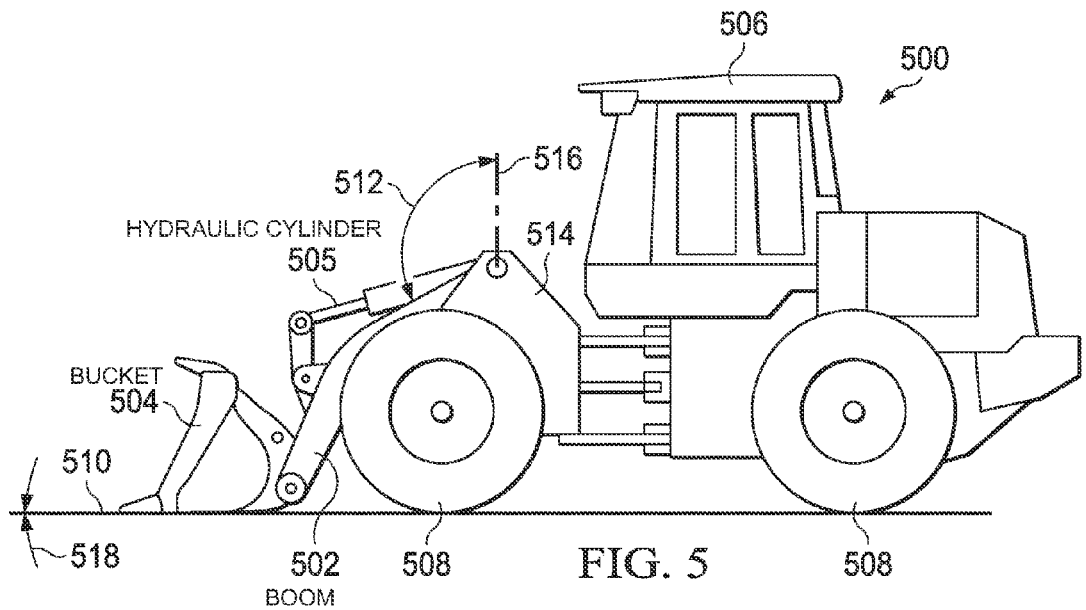
FIG. 5 through FIG. 7 show side views of a vehicle in various operational positions while under control of a control system in accordance with an illustrative embodiment.
Figure 6:
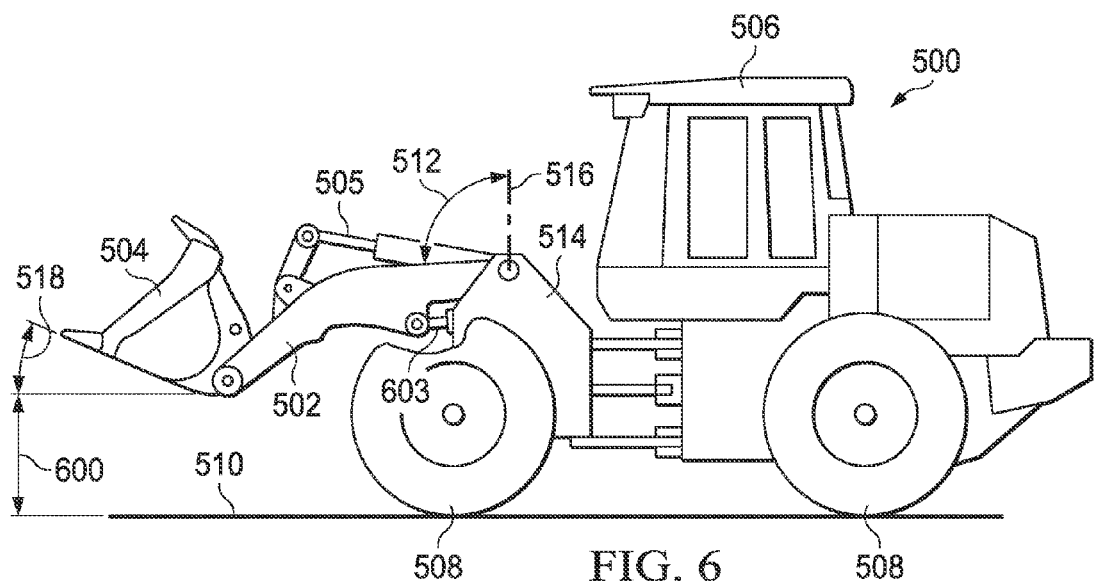
Figure 7:
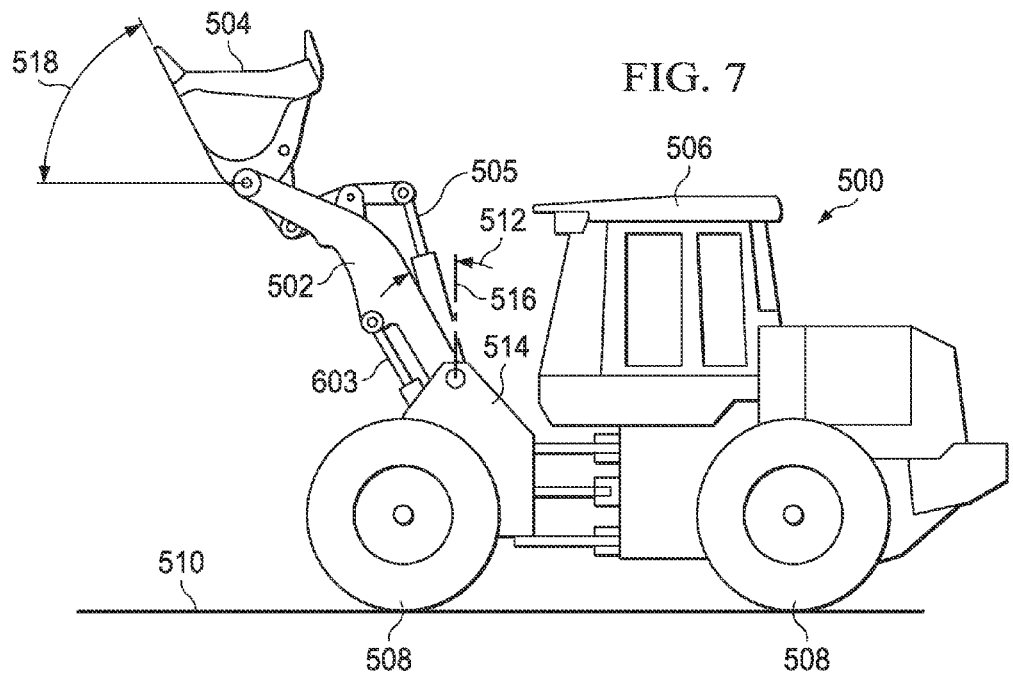

Turning now to FIG. 5 through FIG. 7, side views of a vehicle in various operational positions while under control of a control system in accordance with an illustrative embodiment are illustrated. In this example, vehicle 500 is an example of one implementation of vehicle 106 in FIG. 1 or vehicle 300 in FIG. 3. In this example, vehicle 500 is a loader. Vehicle 500 includes boom 502 and bucket 504. FIG. 5 through FIG. 7 show boom 502 and bucket 504 in various positions as vehicle 500 is operated to perform a bucket-filling operation. For example, in accordance with an illustrative embodiment, boom 502 and bucket 504 may be moved through the various positions illustrated in FIG. 5 through FIG. 7 to perform a bucket-filling operation using both human operator and automated controller input.

In accordance with an illustrative embodiment, boom 502 may be moved into the various positions illustrated by operation of first hydraulic cylinder 603 in FIG. 6. In accordance with an illustrative embodiment, bucket 504 may be moved into the various positions illustrated by operation of second hydraulic cylinder 505.

Vehicle 500 may include cab 506. An operator of vehicle 500 may be positioned in cab 506 during operation of vehicle 500 to perform a task. In accordance with an illustrative embodiment, human operator controller 130 and indicator 150 of FIG. 1 may be positioned in cab 506. In other embodiments, cab 506 may not be present.

In this example, vehicle 500 includes wheels 508 for propulsion of vehicle 500 over ground 510 or another surface. In other embodiments, wheels 508 may be replaced by cogwheels, such as sprockets and tracks. The tracks may comprise linked members or a belt. The cogwheels engage the linked members or the belt for propulsion of vehicle 500 over ground 510 or another surface. If vehicle 500 is equipped with tracks rather than wheels 508, vehicle 500 may be referred to as a tracked vehicle or a crawler. One or more wheels 508 or cogwheels and tracks of vehicle 500 may be propelled by an internal combustion engine, an electric drive motor, or both, to move vehicle 500 across ground 510 or another surface.

In FIG. 5 vehicle 500 is shown in a preliminary position. The preliminary position may represent a position in which digging into a pile of material may be started. The preliminary position is associated with boom 502 in a lower boom position. The preliminary position or lower boom position may be defined as boom 502 that has boom height less than a critical height above the ground. Alternatively, the lower boom position may be defined in terms of boom angle 512 of boom 502 relative to support 514 of vehicle 500 or to vertical reference axis 516. Accordingly, the lower boom position may be associated with boom angle 512 relative to vertical reference axis 516 that is greater than a critical boom angle.

In the preliminary position illustrated in FIG. 5, bucket angle 518 with respect to boom 502 may fall within a range from approximately zero to approximately twenty-five degrees. Alternatively, bucket angle 518 in the preliminary position may fall within any other appropriate range for digging into a pile of material. For example, in the preliminary position, a bottom of bucket 504 may be in a generally horizontal position or substantially parallel to ground 510. In this case, bucket angle 518 is approximately zero degrees.

In FIG. 6, vehicle 500 is shown in a secondary position. The secondary position is characterized by a second boom position or boom height 600 of boom 502 that is higher than a first boom position associated with the preliminary position. The secondary position is associated with an elevated boom position, which is higher than the lower boom position. The second position or elevated boom position may be defined as boom 502 with boom height 600 that is greater than a critical height above ground 510. Alternatively, the second boom position or elevated boom position may be defined in terms of boom angle 512 of boom 502 relative to support 514 of vehicle 500 or vertical reference axis 516. Accordingly, the second boom position or elevated boom position may be associated with boom angle 512 relative to vertical reference axis 516 that is less than or equal to a critical boom angle.

Bucket angle 518 associated with the secondary position illustrated in FIG. 6 may lie within the same general range as bucket angle 518 associated with the preliminary position illustrated in FIG. 5. Alternatively, bucket angle 518 associated with the secondary position may lie within any another appropriate range for digging into a pile of material.

In FIG. 7, vehicle 500 is shown with bucket 504 and boom 502 in a bucket curl position. The bucket curl position typically represents a position of bucket 504 after bucket 504 holds, contains, or possesses collected material. In the curl position, the mouth of bucket 504 is generally facing or tilted upward. The curl position may be entered into as a terminal portion of a digging process or another maneuver in which bucket 504 is filled with material.

Figure 8:
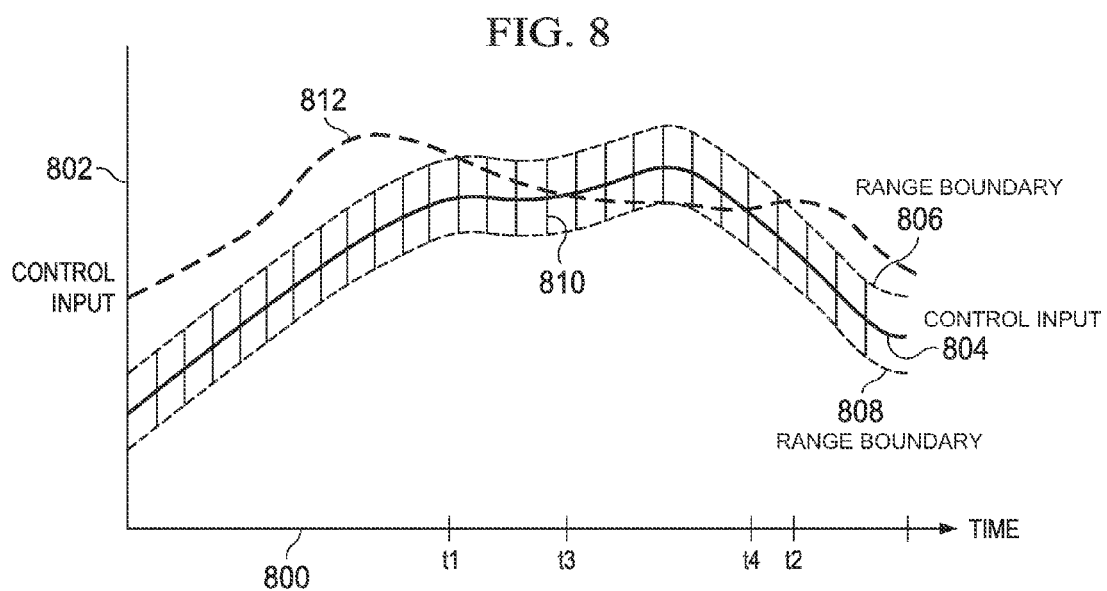
FIG. 8 is an illustration of control input over time as provided by a human operator and as generated by an automated controller for use in controlling a vehicle in accordance with an illustrative embodiment.

Turning now to FIG. 8, an illustration of control input over time as provided by a human operator and as generated by an automated controller for use in controlling a vehicle in accordance with an illustrative embodiment is presented. FIG. 8 illustrates processes in accordance with an illustrative embodiment for selecting either the input of the human operator or the input from an automated controller for controlling operation of a vehicle to perform a task, such as a bucket-filling operation. In FIG. 8, x-axis 800 indicates the cycle time for performing a task, such as filling up a loader bucket. Y-axis 802 indicates a value or level of control inputs for performing the task.

In this example, solid line 804 indicates the control input generated by an automated controller over the task cycle time. Dotted lines 806 and 808 designate upper and lower boundary thresholds, respectively, around solid line 804. The distance between dotted lines 806 and 808 at any point in the task cycle thus defines range 810 from solid line 804. In this example, range 810 defined by dotted lines 806 and 808 extends from a level less than the control input provided by the automated controller to a level greater than the control input provided by the automated controller. In other embodiments, range 810 may extend in only one direction either above or below the control input provided by the automated controller. In this example, range 810 is constant throughout the cycle time for performing the task. In other embodiments, range 810 may vary through the cycle time for performing a task. In general, the size and other characteristics of range 810 may be selected to optimize task performance.

The control input provided by a human operator for the task cycle illustrated in FIG. 8 is indicated by dashed line 812. In accordance with an illustrative embodiment, the relationship between the control input provided by the automated controller, solid line 804, and the control input provided by the human operator, dashed line 812, may be determined throughout the task cycle. Control of the vehicle to perform the task at any point in the task cycle is provided by either the control input from the automated controller or the control input provided by the human operator, depending upon the determined relationship between these inputs at that point in the cycle.

In accordance with a first illustrative embodiment, when the input from a human operator is within range 810 of the automated controller input, then the input from the human operator is used to control vehicle operation. However, if the human operator input is not within range 810, then the automated controller input is used to control vehicle operation. In this case, for the example illustrated in FIG. 8, initially the control input provided by the human operator, dashed line 812, is outside of range 810. During this time, the automated controller input is used to control task operation. In the middle of the cycle, between time $t_1$ and $t_2$, the input from the human operator falls within range 810. Therefore, during this time period, the input from the human operator is used to control vehicle operation to perform the task. In the last part of the cycle, after time $t_2$, the human operator input again falls outside of range 810. Thus, after time $t_2$, the automated controller input again is used to control task operation.

In accordance with another illustrative embodiment, the lower one of the automated controller input or the input from the human operator at any point in the task cycle is used to control the vehicle to perform the task at that point. In this case, for the example illustrated in FIG. 8, initially the control input provided by the automated controller, solid line 804, is lower than the input provided by the human operator, dashed line 812. During this time, the automated controller input is used to control task operation. About half way through the task cycle, at time $t_3$, the control input from the human operator goes lower than the input from the automated controller. Between time $t_3$ and time $t_4$ the input from the human operator is lower than the input from the automated controller. Therefore, during this time period, the input from the human operator is used to control vehicle operation to perform the task. After time $t_4$ the input from the automated controller again is lower than the input from the human operator. Thus, after time $t_4$, the automated controller input again is used to control task operation.

Figure 9:
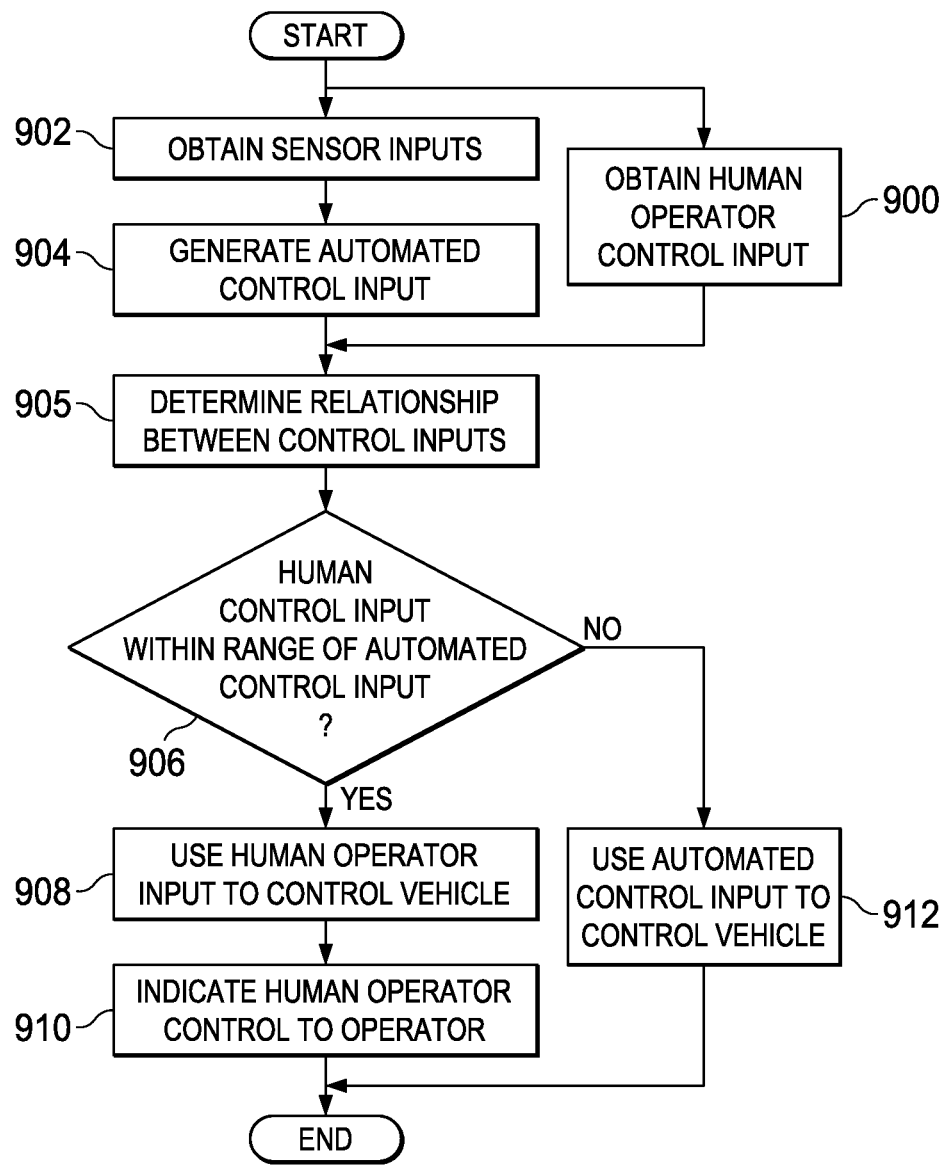
FIG. 9 is a flowchart of a process for controlling a vehicle in accordance with an illustrative embodiment.

Turning now to FIG. 9, a flowchart of a process for controlling a vehicle is depicted in accordance with an illustrative embodiment. The process illustrated in FIG. 9 may be implemented, for example, in control system 100 in FIG. 1. The process illustrated in FIG. 9 may be used to control a vehicle to perform a construction-related task. For example, the process illustrated in FIG. 9 may be used to control a loader to perform a bucket-filling task. The process illustrated in FIG. 9 may be repeated periodically or continuously throughout an operational cycle for controlling a vehicle to perform a task.

In accordance with an illustrative embodiment, first control input relative to a manual input provided by a human operator is obtained (step 900). For example, step 900 may include obtaining human operator input from a human operator controller being manipulated by a human operator.

Simultaneously, sensor inputs are obtained (step 902) and automated control inputs for controlling the vehicle to perform a task are generated from the sensor inputs (step 904). For example, step 902 may include obtaining sensor inputs indicating the current state of the vehicle being controlled or of various components of the vehicle being controlled. Step 904 may include generating automated control input from the provided sensor inputs using an appropriate control algorithm.

A relationship between the first control input provided by the human operator and the second automatically generated control input is determined (step 905). Based on the determined relationship, it is determined whether or not the human operator control input is within range of the automated control input (step 906). Step 906 may be performed periodically or continuously throughout the cycle period during which the vehicle is being controlled to perform a task.

Responsive to a determination that the human operator control input is within the range, the human operator control input is used to control the vehicle to perform the task (step 908). The fact that the human operator control input is being used to control the vehicle may be indicated to the human operator (step 910) with the process terminating thereafter. For example, step 910 may include turning on a visual indicator to indicate that human operator control is being used to control the vehicle.

Responsive to determining that the human operator control input is not within the rage, the automated control input is used to control the vehicle to perform the task (step 912) with the process terminating thereafter.

Figure 10:
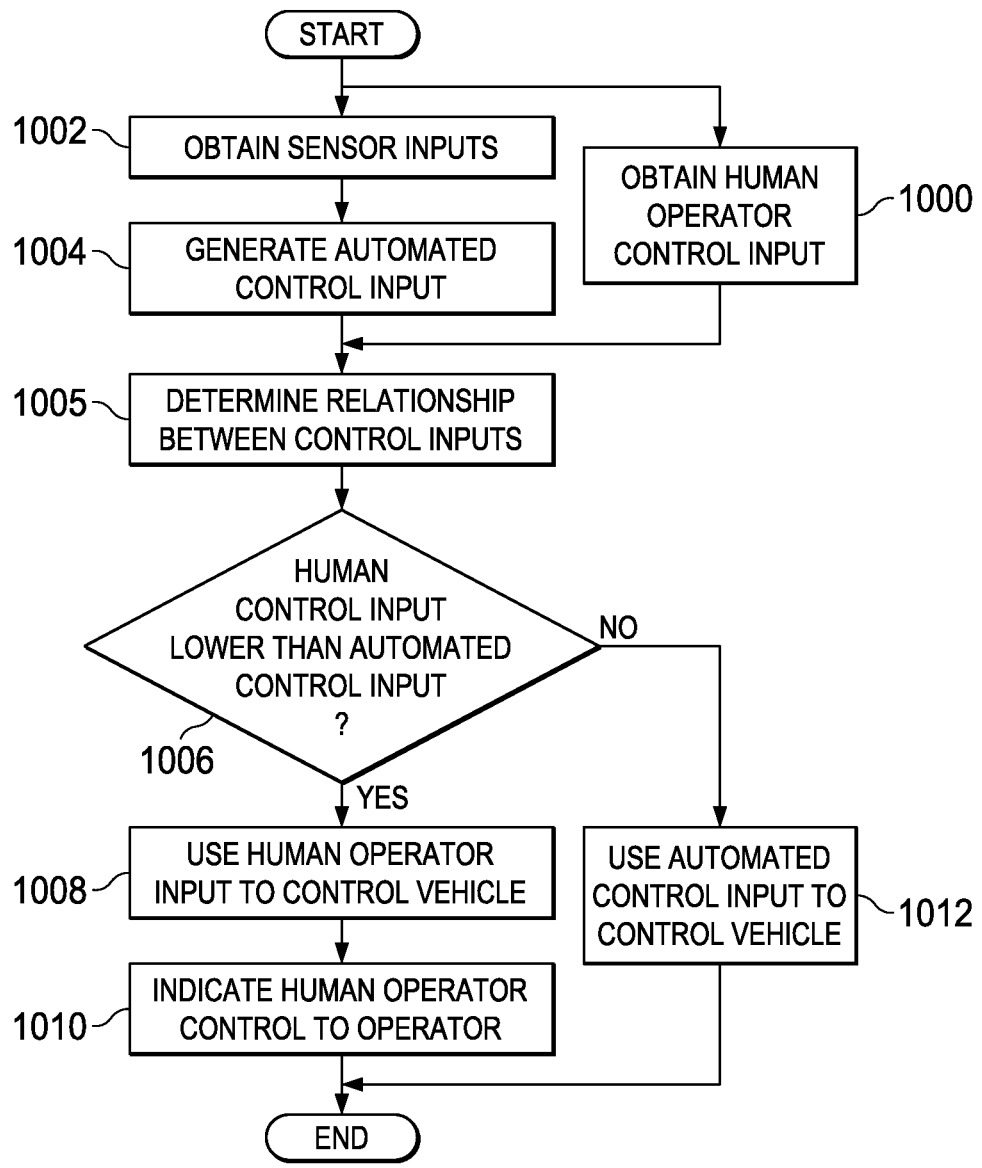
FIG. 10 is a flowchart of a process for controlling a vehicle in accordance with another illustrative embodiment.

Turning now to FIG. 10, a flowchart of a process for controlling a vehicle is depicted in accordance with another illustrative embodiment. The process illustrated in FIG. 10 may be implemented, for example, in control system 100 in FIG. 1. The process illustrated in FIG. 10 may be used to control a vehicle to perform a construction-related task. For example, the process illustrated in FIG. 10 may be used to control a loader to perform a bucket-filling task. The process illustrated in FIG. 10 may be repeated periodically or continuously throughout an operational cycle for controlling a vehicle to perform a task.

In accordance with an illustrative embodiment, first control input relative to a manual input provided by a human operator is obtained (step 1000). For example, step 1000 may include obtaining human operator input from a human operator controller being manipulated by a human operator.

Simultaneously, sensor inputs are obtained (step 1002) and automated control inputs for controlling the vehicle to perform a task are generated from the sensor inputs (step 1004). For example, step 1002 may include obtaining sensor inputs indicating the current state of the vehicle being controlled or of various components of the vehicle being controlled. Step 1004 may include generating automated control input from the provided sensor inputs using an appropriate control algorithm.

A relationship between the first control input provided by the human operator and the second automatically generated control input is determined (step 1005). Based on the determined relationship, it is determined whether or not the human operator control input is lower than the automated control input (step 1006). Step 1006 may be performed periodically or continuously throughout the cycle period during which the vehicle is being controlled to perform a task.

Responsive to a determination that the human operator control input is lower than the automated control input, the human operator control input is used to control the vehicle to perform the task (step 1008). The fact that the human operator control input is being used to control the vehicle may be indicated to the human operator (step 1010) with the process terminating thereafter. For example, step 1010 may include turning on a visual indicator to indicate that human operator control is being used to control the vehicle.

Responsive to determining that the human operator control input is not lower than the automated control input, the automated control input is used to control the vehicle to perform the task (step 1012) with the process terminating thereafter.

Figure 11:
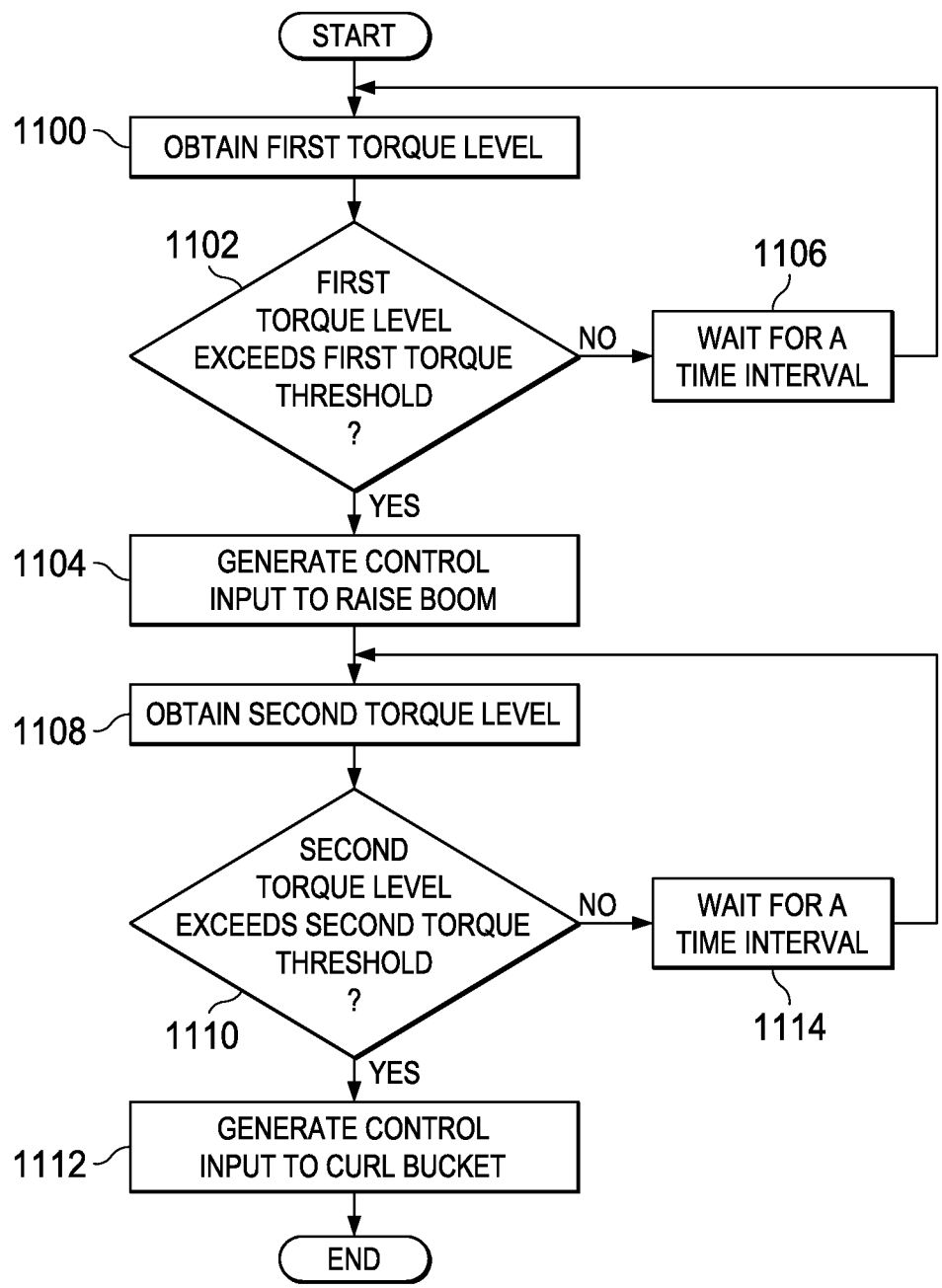
FIG. 11 is a flowchart of a process for generating automated control input for controlling a loader to perform a bucket-filling task in accordance with an illustrative embodiment.

FIG. 11 is a flowchart of a process for generating automated control input for controlling a loader to perform a bucket-filling task in accordance with an illustrative embodiment. For example, the process illustrated in FIG. 11 may be used to generate the automated control input in step 904 in FIG. 9 or step 1004 in FIG. 10.

A first torque level of torque applied to at least one wheel of the vehicle being controlled is obtained (step 1100). For example, step 1100 may include obtaining the first torque level from a torque sensor. The first torque level may be detected while an attachment or a bucket of the vehicle engages a pile of material or when the vehicle is in a preliminary position with the boom in a first, lower, position. The detected first torque level or rimpull may be derived or estimated based on a torque measurement associated with a shaft of the transmission, drivetrain, torque converter, or otherwise.

It is determined whether or not the detected first torque level exceeds a first torque threshold (step 1102). The first torque threshold refers to or is derived from a first maximum torque level associated with a preliminary position or lower boom position of the vehicle. The lower boom position or preliminary boom position may be defined as a boom height being less than a critical boom height or a boom angle greater than a critical boom angle with respect to a vertical reference axis.

In one embodiment, the first torque threshold may be established based on a first maximum torque level at which the wheels loose traction in the preliminary position or lower position or skid or slip on the ground. The first maximum torque level may, but need not, be reduced by a safety margin to improve reliability. The first maximum torque level may be established based on a model, an empirical study, a field test, or otherwise.

Under certain models, the first maximum torque level may vary based on one or more of the following factors: the vehicle characteristics, vehicle weight, weight distribution of the vehicle, vehicle suspension configuration, spring constant associated with vehicle suspension or struts, vehicle geometry, tire size, tire tread, tire diameter, tire foot-print, ground characteristics, such as compressibility and moisture content, and coefficient of friction between the ground and one or more tires, among other factors. The coefficient of friction depends on the characteristics of various materials that comprise the tires and the ground, such as paved surface, concrete, asphalt, unpaved surface, gravel, bare topsoil, bare subsoil, or the like.

If it is determined in step 1102 that the detected first torque level exceeds the first threshold, then automated control input is generated for raising a boom associated with the vehicle (step 1104). For example, step 1104 may include automatically generating control input to raise the boom above a lower position or preliminary boom position when the first torque level reaches a first torque threshold. In one example of carrying out step 1104, automated control input is generated for raising the boom from the preliminary position to a secondary position to increase the available torque or reserve torque that can be applied to the wheels to a torque level that exceeds the first torque threshold. As the vehicle pushes further into a pile of material and encounters a greater level of resistance, more traction is developed by raising the boom to an elevated position or second boom position to facilitate filling of the bucket, because raising the boom places a downward force or down-weighting on the front wheels.

Under a first technique for executing step 1104, automated controller input may be generated for increasing an initial rate of upward boom movement associated with the boom to a higher rate of boom movement proportionally to an increase in the detected first torque level during a time interval. Under a second technique for executing step 1104, automated controller input may be generated for increasing an initial rate of upward boom movement associated with the boom to a higher rate of boom movement proportionally to a decrease in the detected ground speed of the vehicle during a time interval. In this case, the detected ground speed of the vehicle may be provided by a ground speed sensor. Under a third embodiment, automated controller input may be generated for increasing an initial rate of upward boom movement associated with the boom to a higher rate of boom movement proportionally to a combination of an increase in the detected first torque level and a simultaneous decrease in the detected ground speed of the vehicle during a time interval. Under a fourth embodiment, automated controller input may be generated for raising the boom a predetermined amount commensurate with a height of a detected pile. In this case, the height of the detected pile may be determined using an imaging system.

If it is determined in step 1102 that the detected first torque level does not exceed the first threshold, then the process may wait for a time interval (step 1106). After step 1106, step 1100 may be repeated to obtain the first torque level again and step 1102 may be repeated to determine whether or not the first torque level exceeds the first torque threshold.

During or after raising the boom to an elevated boom position, a second torque level applied to at least one wheel of the vehicle is obtained (step 1108). Step 1108 may include obtaining the second torque level using a torque sensor. The second torque level is generally greater than the first torque level.

It is determined whether or not the detected second torque level exceeds a second torque threshold (step 1110). The second torque threshold refers to or is derived from a second maximum level of torque associated with the vehicle in an elevated boom position. The elevated boom position corresponds to a boom height greater than or equal to a critical height or a boom angle less than a critical boom angle with respect to a vertical reference axis. The second torque threshold is generally associated with a second maximum torque level at which the wheels loose traction, break away from the ground, skid or slip in the secondary position, where the boom is in an elevated boom position or second boom position.

If it is determined in step 1110 that the second torque level exceeds the second torque threshold, then automated controller input is generated for curling or upwardly rotating a bucket associated with the vehicle (step 1112) with the process terminating thereafter. For example, step 1112 may include generating automated controller input to move the bucket into a bucket curl position when the detected second torque level meets or exceeds a second torque threshold. Curling the bucket relative to the boom reduces the resistance on the bucket from the material being scooped into the bucket.

Step 1112 may be executed in accordance with various techniques that may be applied individually or cumulatively. Under a first technique of executing step 1112, automated controller input may be generated for increasing an initial rate of upward bucket rotation associated with the bucket to a higher rate of bucket rotation proportionally to an increase in the detected second torque level during a time interval. Under a second technique of executing step 1112, automated controller input may be generated for increasing an initial rate of upward bucket rotation associated with the bucket to a higher rate of bucket rotation proportionally to a decrease in the detected ground speed during a time interval. Under a third technique of executing step 1112, automated controller input may be generated for increasing an initial rate of upward bucket rotation associated with the bucket to a higher rate of bucket rotation proportionally to a combination of an increase in the detected second torque level and a simultaneous decrease in the detected ground speed during a time interval.

If it is determined in step 1110 that the second torque level does not exceed the second torque threshold, then the process may wait for a time interval (step 1114). After waiting in step 1114, the process may return to step 1108 to obtain the second torque level again and to determine whether or not the second torque level exceeds the second torque threshold.

Other processes may be used to generate automated controller input for controlling a loader to perform a bucket-filling task. These other processes my include processes that include variations on the process described with reference to FIG. 11 or completely different processes.

One or more of the illustrative embodiments provides a capability to use input from both a human operator and an automated controller to control a vehicle to perform a task. A vehicle control system determines a relationship between the two inputs and determines which of the two to use based on the determined relationship. Collaborative control of a vehicle using both human operator input and automated controller input to perform a task takes advantage of both human operator skill and proven automated controller performance to improve overall task performance. Aspects of the illustrative embodiments are described with reference to flowchart illustrations and/or block diagrams of methods, apparatus and computer program products according to the illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions also may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions also may be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the illustrative examples, the hardware may take the form of a circuit system, an integrated circuit, an application specific integrated circuit (ASIC), a programmable logic device, or some other suitable form of hardware configured to perform a number of operations. With a programmable logic device, the device is configured to perform the number of operations. The device may be configured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. A method, in accordance with the illustrative examples, may be implemented by a processor unit consisting entirely or partly of one or more of the circuits and/or devices described in this paragraph or similar hardware.

The flowcharts and block diagrams in the Figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. A "number", as used herein with reference to items, means one or more items.

The description of the different illustrative embodiments has been presented for purposes of illustration and description, and is not intended to be exhaustive or to limit the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the illustrative embodiments, the practical application, and to enable others of ordinary skill in the art to understand the illustrative embodiments with various modifications as are suited to the particular use contemplated.

What is claimed is:

1. A method of controlling a vehicle, comprising:
   obtaining, by a processor unit, a first control input, wherein the first control input is relative to a manual input provided by a human operator;
   obtaining, by the processor unit, a number of sensor inputs, wherein the number of sensor inputs indicate a state of the vehicle;
   generating, by the processor unit, a second control input using the number of sensor inputs;
   determining, by the processor unit, a relationship between the first control input and the second control input;
   selecting, by the processor unit, one of the first control input and the second control input based on the determined relationship between the first control input and the second control input;
   responsive to selecting the first control input, using the manual input provided by the human operator to control the vehicle; and
   responsive to selecting the second control input, using the second control input to control the vehicle.

2. The method of claim 1, wherein:
   determining the relationship between the first control input and the second control input comprises determining which one of the first control input and the second control input has a lower value; and
   selecting one of the first control input and the second control input comprises selecting the first control input responsive to a determination that the first control input has the lower value and selecting the second control input responsive to a determination that the second control input has the lower value.

3. The method of claim 1, wherein:
   determining the relationship between the first control input and the second control input comprises determining whether the first control input is within a range from the second control input; and
   selecting one of the first control input and the second control input comprises selecting the first control input responsive to a determination that the first control input is within the range from the second control input and selecting the second control input responsive to a determination that the first control input is not within the range from the second control input.

4. The method of claim 3, wherein the range extends from less than the second control input to greater than the second control input.

5. The method of claim 1 further comprising:
   responsive to selecting the first control input, controlling, by the processor unit, an indicator to indicate to the human operator that the manual input provided by the human operator is being used to control the vehicle.

6. The method of claim 5, wherein the indicator is a visual indicator and wherein controlling the indicator comprises turning the visual indicator on to indicate to the human operator that the manual input provided by the human operator is being used to control the vehicle.

7. The method of claim 1, wherein:
   the vehicle is a loader comprising a boom and a bucket attached to the boom;
   using the manual input provided by the human operator to control the vehicle comprises using the manual input provided by the human operator to control movement of the boom and the bucket to load a material into the bucket; and
   using the second control input to control the vehicle comprises using the second control input to control movement of the boom and the bucket to load the material into the bucket.

8. The method of claim 1, wherein the number of sensor inputs comprises an input from a sensor configured to detect a level of torque applied to a wheel of the vehicle.

9. An apparatus, comprising:
   a human operator controller configured to receive manual input from a human operator to control a vehicle, wherein the human operator controller is configured to provide a first control input relative to the manual input;
   a number of sensors mounted on the vehicle, wherein the number of sensors are configured to generate a number of sensor inputs and wherein the number of sensor inputs indicate a state of the vehicle; and
   a processor unit coupled to the human operator controller and to the number of sensors and configured to:
      generate a second control input using the number of sensor inputs,
      determine a relationship between the first control input and the second control input,
      select one of the first control input and the second control input based on the determined relationship between the first control input and the second control input,
      generate first control signals to control the vehicle using the manual input provided by the human operator responsive to selecting the first control input, and
      generate the first control signals to control the vehicle using the second control input responsive to selecting the second control input.

10. The apparatus of claim 9, wherein the processor unit is configured to:
   determine the relationship between the first control input and the second control input by determining which one of the first control input and the second control input has a lower value; and
   select one of the first control input and the second control input by selecting the first control input responsive to a determination that the first control input has the lower value and selecting the second control input responsive to a determination that the second control input has the lower value.

11. The apparatus of claim 9, wherein the processor unit is configured to:
   determine the relationship between the first control input and the second control input by determining whether the first control input is within a range from the second control input; and
   select one of the first control input and the second control input by selecting the first control input responsive to a determination that the first control input is within the range from the second control input and selecting the second control input responsive to a determination that the first control input is not within the range from the second control input.

12. The apparatus of claim 11, wherein the range extends from less than the second control input to greater than the second control input.

13. The apparatus of claim 9 further comprising an indicator and wherein the processor unit is coupled to the indicator and the processor unit is further configured to generate second control signals responsive to selecting the first control input, wherein the second control signals control the indicator to indicate to the human operator that the manual input provided by the human operator is being used to control the vehicle.

14. The apparatus of claim 13, wherein the indicator is a visual indicator and wherein the second control signals comprise control signals configured to turn the visual indicator on to indicate to the human operator that the manual input provided by the human operator is being used to control the vehicle.

15. The apparatus of claim 9, wherein:
the vehicle is a loader comprising a boom and a bucket attached to the boom; and
the first control signals are configured to control movement of the boom and the bucket to load a material into the bucket.

16. The apparatus of claim 9, wherein the number of sensors comprises a sensor configured to detect a level of torque applied to a wheel of the vehicle.

17. The apparatus of claim 9, wherein the human operator controller comprises a joystick.

18. A computer program product for controlling a vehicle, comprising:
a non-transitory computer readable storage medium;
first program instructions to obtain a first control input, wherein the first control input is relative to a manual input provided by a human operator;
second program instructions to obtain a number of sensor inputs, wherein the number of sensor inputs indicate a state of the vehicle;
third program instructions to generate a second control input using the number of sensor inputs;
fourth program instructions to determine a relationship between the first control input and the second control input;
fifth program instructions to select one of the first control input and the second control input based on the determined relationship between the first control input and the second control input;
sixth program instructions to generate first control signals to control the vehicle using the manual input provided by the human operator responsive to selecting the first control input;
seventh program instructions to generate the first control signals to control the vehicle using the second control input responsive to selecting the second control input; and
wherein the first, second, third, fourth, fifth, sixth, and seventh program instructions are stored on the computer readable storage medium.

19. The computer program product of claim 18, wherein:
the fourth program instructions comprise program instructions to determine which one of the first control input and the second control input has a lower value; and
the fifth program instructions comprise program instructions to select the first control input responsive to a determination that the first control input has the lower value and to select the second control input responsive to a determination that the second control input has the lower value.

20. The computer program product of claim 18, wherein:
the fourth program instructions comprise program instructions to determine whether the first control input is within a range from the second control input; and
the fifth program instructions comprise program instructions to select the first control input responsive to a determination that the first control input is within the range from the second control input and to select the second control input responsive to a determination that the first control input is not within the range from the second control input.

21. The computer program product of claim 20, wherein the range extends from less than the second control input to greater than the second control input.

22. The computer program product of claim 18 further comprising:
eighth program instructions to generate second control signals to control an indicator to indicate to the human operator that the manual input provided by the human operator is being used to control the vehicle responsive to selecting the first control input; and
wherein the eighth program instructions are stored on the computer readable storage medium.

23. The computer program product of claim 22, wherein the indicator is a visual indicator and wherein the second control signals comprise control signals configured to turn the visual indicator on to indicate to the human operator that the manual input provided by the human operator is being used to control the vehicle.

24. The computer program product of claim 18, wherein:
the vehicle is a loader comprising a boom and a bucket attached to the boom; and
wherein the first control signals are configured to control movement of the boom and the bucket to load a material into the bucket.

25. The computer program product of claim 18, wherein the number of sensor inputs comprises an input from a sensor configured to detect a level of torque applied to a wheel of the vehicle.

* * * * *